Patented June 16, 1953

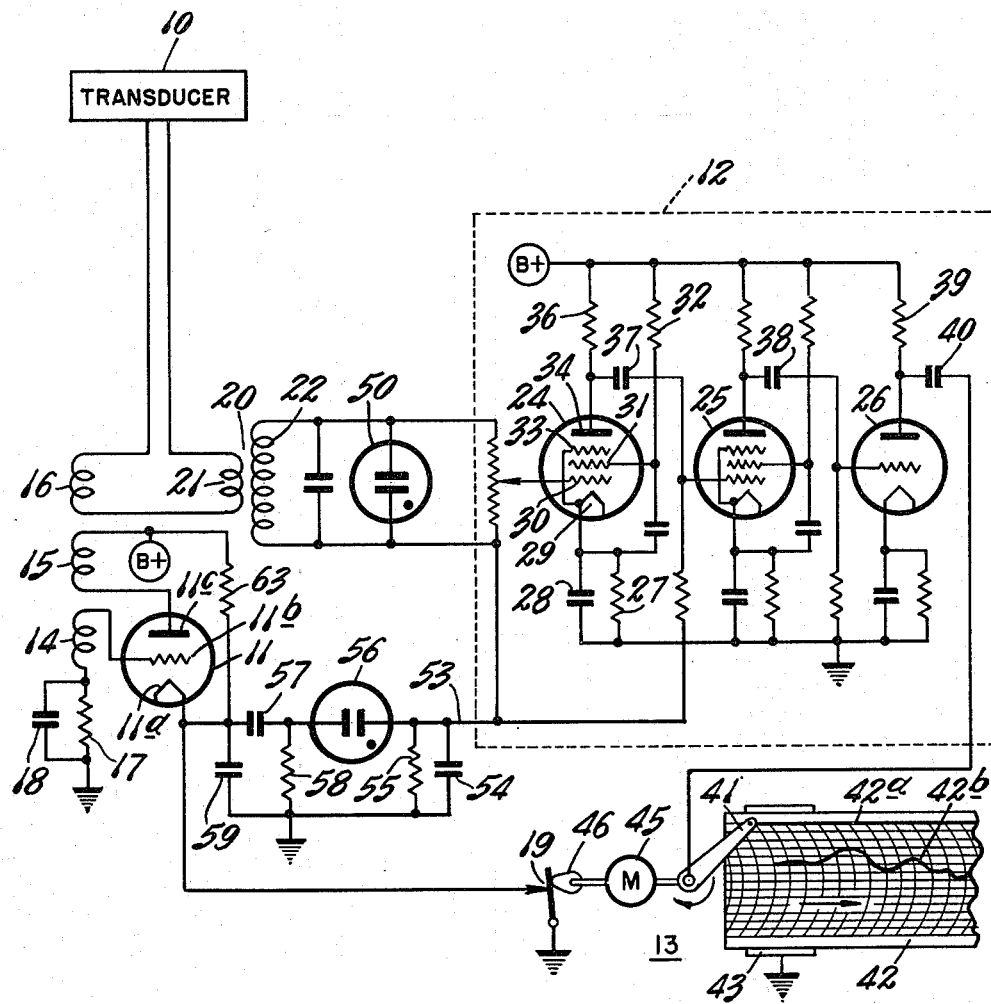

2,642,562

UNITED STATES PATENT OFFICE 2,642,562

ECHO DISTANCE MEASURING CIRCUIT

James L. Russell, Sun Valley, Calif., assignor to Bendix Aviation Corporation, South Bend, Ind., a corporation of Delaware Application August 24, 1949, Serial No. 112,107

7 Claims. (Cl. 340—6)

This invention relates to distance measuring systems of the type in which a traveling wave is transmitted from a reference point, and the echo thereof from a distant object is received and caused to produce an indication, the time elapsing between the transmission of the wave and the receipt of the echo being a measure of the distance. Such systems are well-known and may use electromagnetic waves, such as radio, or compressional waves of sonic or supersonic frequency in air, water, or other mediums.

An object of the invention is to provide a simple and practicable system for reducing the effect on the echo-receiving portion of the system of the transmitted waves which are much more powerful than the returning echoes.

Another object is to provide a simple and effective circuit for varying the sensitivity of the receiving system with time, so that it is sufficiently sensitive to weak echoes received from great distances without being unnecessarily sensitive to interference during receipt of strong echoes from closer objects.

Another object is to combine the foregoing advantages in a system using a single transducer for both transmission and reception.

Other more specific objects and features of the invention will become apparent from the description to follow:

Briefly the first object is achieved in accordance with the invention by connecting the transducer which transmits and receives the traveling waves effectively in series with the transmitter and receiver, and shunting the receiver with a discharge device, such as a neon lamp, that normally has such high impedance as to produce no shunting effect on the receiver during the reception of the relatively weak echo signals but that breaks down in response to the stronger transmitted signals to not only make the receiver insensitive thereto but to offer a low impedance path for efficient conduction of the transmitted signals to the transducer. In this connection it is to be understood that discharge devices have been connected in shunt to receivers before, but it is believed to be new to employ one in a system in which the transmitter, receiver and transducer are connected in series with each other so that the transmitter delivers power to the transducer through the discharge device, thereby providing a particularly simple and effective circuit.

The second object is achieved by employing time-varied gain in the receiver, and energizing the time-varied gain circuit from the transmitter through a second discharge device, such as a neon lamp, connected between the keying circuit of the transmitter and the time-varied gain circuit of the receiver, so that a high transient potential developed in the transmitter at the instant of keying breaks down the discharge device and charges the time-varied gain biasing circuit which is then automatically isolated from the transmitter by the recovery of the discharge device to its normal non-conductive state. This eliminates the necessity of auxiliary switches mechanically synchronized with the transmitter key for charging the biasing circuit.

The manner in which the remaining objects are achieved will be apparent from the following description with reference to the drawing.

The single figure of the drawing is a schematic circuit diagram of a system incorporating the invention.

The system comprises as essential elements: a transducer 10, a transmitter 11, a receiver 12, and an indicator or recorder 13.

The transducer 10 may be of any known type, its exact characteristics depending upon the conditions to be met. Thus it might be of the magnetic, piezocrystal, or magnetostriction type for converting electrical waves into compressional waves, and vice versa, for signalling through a medium such as air, water, or the earth, or it might be an antenna for converting electrical waves into electromagnetic waves, and vice versa, if conditions are such, as in aircraft altimeters, that electromagnetic waves are desirable.

As shown in the drawing, the transmitter comprises a transmitting tube 11 of the 3-electrode type having a cathode 11a, a control grid 11b, and a plate or anode 11c. The anode and cathode circuits are coupled together in feedback relation to cause the tube to oscillate continuously when energized. To this end, a transformer is provided having three windings 14, 15 and 16, all magnetically coupled together. The winding 15 is connected between the anode 11c and the positive terminal of the source of B potential for energizing it, and the winding 14 is connected between the grid 11b and ground through a grid leak resistor 17 and a condenser 18. The transmitter is keyed by a key 19 that momentarily connects the cathode 11a to ground when a signal is to be transmitted. It will be understood that, in accordance with usual practice, the negative terminal of the B supply is connected to ground. When the key 19 is open, there is no D. C. connection from the cathode 11a to ground (and the negative terminal of the B supply), and it rises to the potential of the positive terminal of the B supply, which feature is utilized to automatically control the time-varied gain circuit to be described later.

The oscillations developed in the transformer windings 14 and 15 are applied through the transformer winding 16 to the transducer 10 and to the primary winding 21 of a step-up transformer 20, the secondary winding 22 of which is connected to the input terminals of the receiver 12. This receiver is of conventional design, employing two variable mu pentode voltage amplifying tubes 24 and 25 and a power output triode 26. Each of the tubes 24 and 25 has a cathode 29 connected to ground through the usual biasing resistor 27 and bypass condenser 28, a control grid 30, a screen grid 31 maintained at positive potential by connection through resistor 32 to the B+ terminal, a suppressor grid 33 connected to the cathode, and an anode 34 connected to the B+ terminal through a resistor 36. The anode 34 of tube 24 is coupled to the control grid of tube 25 through a coupling condenser 37, and the anode of tube 25 is coupled through a coupling condenser 38 to the control grid of the triode 26. The anode of tube 26 is connected to the B+ terminal through the usual resistor 39 and through a coupling condenser 40 to the stylus 41 of the recorder 13, which stylus rotates over a slowly moving record tape 42 of electrically sensitive paper which is marked in response to an electrical discharge therethrough. The mechanism for moving the paper tape may be conventional and is not illustrated. The paper is shown moving over a plate 43 which is grounded to complete a circuit from the stylus 41 through the paper.

The stylus 41 is rotated at a predetermined speed, and the key 19 is actuated in synchronism therewith, by a motor 45, the shaft of which is shown in the schematic diagram as connected to the arm of the stylus 41 and also to a cam 46 for closing the key 19 once during each revolution.

The stylus 41 is shown in the position it assumes at the instant the cam 46 closes the key 19. The closure of this key completes the circuit from the cathode 11a of tube 11 to ground, and the negative terminal of the B supply, thereby energizing that tube and causing it to oscillate. The oscillations are applied by the transformer winding 16, through the primary winding 21 of the transformer 20 to the transducer 10. Ordinarily such series connection of the transmitter and receiver with the transducer, as shown, would be objectionable because the receiver has a high impedance, with the result that a very powerful signal would be applied to the receiver and a relatively weak signal to the transducer 10. However, in accordance with the present invention, the secondary winding 22 of the step-up transformer 20 is shunted by a discharge device, shown as a neon tube 50, which tube ionizes and breaks down at a voltage substantially lower than that applied thereto from the transmitting tube 11. When the tube 50 breaks down it becomes substantially a short circuit, the effect of which is applied through the transformer 20 to the winding 21 so that substantially all of the power generated in the tube 11 is applied to the transducer 10 to strongly energize the latter and send out powerful traveling waves. As soon as the key 19 opens, the cathode circuit of the tube 11 is opened, and the oscillations cease. The neon lamp 50 thereupon immediately recovers its normal, substantially infinite impedance, so that it does not diminish the strength of oscillations developed in the transducer 10 and applied to the receiver 12 in response to echoes of the transmitted traveling waves.

Of course despite the breakdown of the neon lamp 50 and its effective shunting of the major portion of the power represented by the transmitted oscillations to the transducer 10, enough of this power gets through the receiver 12 to energize the stylus 41, and produce marks which add up to produce a baseline 42a on the record paper 42.

Following transmission of the traveling waves from the transducer 10, echoes may be received from either close objects or distant objects. However, since the transmitted waves are attenuated with distance, and the echoes are likewise attenuated, the echoes received from distant points will be much weaker than those received from closer points. Hence it is desirable to vary the sensitivity of the receiver 12 from a relatively insensitive condition at the time of transmission of the traveling waves to a highly sensitive condition at the time when echo waves from most distant points would be received. To this end, the control grids 30 of the variable mu pentode tubes 24 and 25 are connected to a common biasing lead 53 which is varied from a high negative potential at the instant of transmission, to substantially zero potential a predetermined time thereafter. To supply this varying potential, the conductor 53 is connected to ground through a condenser 54 and a leak resistor 55, and through a second discharge device, such as a neon lamp 56, and a second condenser 57 to the cathode 11a of the transmitting tube 11. Another grounding leak resistor 58 is connected between the lamp 56 and the condenser 57, and a condenser 59 is connected between the cathode 11a and ground.

Just prior to the closure of the key 19, the cathode 11a of the transmitting tube is isolated from ground and is at the potential of the B+ terminal, and the condenser 57 is charged to this potential. To insure that the condenser will be fully charged and that the cathode 11a will be at the potential of the B+ terminal, a leak resistor 63 may be connected between the B+ terminal and the cathode 11a.

When the key 19 is closed to apply ground to the cathode 11a, the positive potential thereof is suddenly reduced to zero. This not only renders the cathode sufficiently negative with respect to the control grid 11b to permit the tube to oscillate, but applies a surge through the condenser 57, to the lamp 56, which ionizes the lamp 56 and causes it to become conductive. This causes a negative charge which was previously stored on the right plate of the condenser 57 to surge through the lamp 56 and charge the condenser 54. As this latter condenser becomes charged, the current through the lamp 56 diminishes to the point where the lamp deionizes and becomes non-conductive, so that the negtive charge remains on the condenser 54 and the biasing lead 53 until it can leak off through the resistor 55. The condenser 54 and resistor 55 are so chosen with respect to the distances to be measured, and the propagation velocity of the traveling waves, as to permit the condenser 54 to substantially completely discharge in the time required for return of echoes from the greatest distance the apparatus is intended to measure.

When the echo returns and actuates the transducer 10, the electrical oscillations produced in the transducer are applied to the transformer windings 16 and 21, and by virtue of the fact that the transformer 20 is a step-up transformer, the voltage is amplified prior to application to the receiver 12. However, the highest voltages produced by returning echoes are insufficient to ionize the neon lamp 50, so that they are applied in full strength to the receiver 12. If a relatively powerful echo has returned from a short distance, the control grids 30 of the tubes 24 and 25 will still have a strong negative bias thereon, and the amplifier will be relatively insensitive. On the other hand, if the echo has returned from a great distance, under which condition it would be relatively weak, the biasing potential on the lead 53 will have greatly diminished, thereby restoring the tubes 24 and 25 to relatively high sensitivity to build up the weaker signal sufficiently to actuate the recorder. As is well known, the stylus 41 will have traveled across the paper 42 from the baseline 42a a distance proportional to the time required for the echo to return before it is energized by the echo to produce a line 42b indicative of the distance.

The use of the discharge device 50 in the input circuit of the receiver is primarily useful when the transmitter, receiver and condenser are connected in series relation, as shown. However, the use of the second discharge device 56 as a switching element through which the time-varied gain circuit is charged is not limited to the particular system shown, and is equally useful in a system in which separate transmitting and receiving transducers are employed.

Although for the purpose of explaining the invention, a particular embodiment thereof has been shown and described, obvious modifications will occur to a person skilled in the art, and I do not desire to be limited to the exact details shown and described.

I claim:

1. An echo distance measuring system comprising: a transducer; a transmitter for energizing said transducer; a receiver having bridged across its input and a parallel oscillatory circuit tuned to the signal frequency and shunted by a discharge device normally having a high impedance but breaking down to a low impedance in response to a potential above a critical value intermediate the potentials developed in said transducer in response to received echoes and the potentials produced by said transmitter, respectively; and circuit means connecting said transmitter and said receiving oscillatory circuit in series with each other and with said transducer, whereby said transmitter, said receiving oscillatory circuit, and said transducer constitute a single current path.

2. A system according to claim 1, in which said parallel oscillatory circuit comprises a step-up transformer having a primary winding connected in series with said transmitter and transducer, and a tuned secondary winding connected to said receiver.

3. A system according to claim 1 in which: said receiver comprises a vacuum tube amplifier having a cathode and a grid, the sensitivity of which amplifier decreases with increasing negative bias of the grid with respect to the cathode; said transmitter comprises a normally non-conductive control device rendered conductive when keyed, to energize said transducer; and means responsive to transition of said control device from the non-conductive to the conductive state for generating a transient biasing potential between the cathode and grid of said vacuum tube amplifier to negatively bias the grid simultaneously with the breakdown of said discharge device; said last mentioned means including a second discharge device interposed between said control device and said vacuum tube amplifier; a condenser connected to said grid for receiving a charge through said second discharge device; a resistor shunting said condenser for discharging it at a predetermined rate; said second discharge device comprising a cold electrode gaseous discharge tube normally having substantially infinite impedance but breaking down temporarily in response to transition of said control device from non-conductive to the conductive state whereby it first passes charging current to said condenser and thereafter isolates said charged condenser from said control device.

4. An echo distance measuring system comprising: transmitting means including a key for transmitting travelling waves when keyed, and including an electrical circuit in which a transient potential is produced when the transmitting means is keyed; a receiving means for producing an indication in response to echoes of said transmitted travelling waves and including a vacuum tube amplifier having a biasing terminal, the sensitivity of which amplifier is responsive to the potential of said biasing terminal; a condenser connected to said biasing terminal for storing a biasing charge applied thereto, and a resistor shunting said condenser for diminishing said charge at a predetermined time rate; and circuit means including a discharge device connecting said electrical circuit in said transmitting means to said biasing terminal; said discharge device comprising a cold electrode gaseous discharge diode normally having substantially infinite impedance but breaking down temporarily in response to said transient potential to apply the latter to said biasing terminal and thereafter isolate said terminal from said electrical circuit.

5. A system according to claim 4 in which said transmitting means includes a thermionic tube having a cathode and anode; a source of B potential having its positive terminal connected permanently to said anode and its negative terminal connectable to said cathode through said key; and means connecting said cathode to said discharge device.

6. A system according to claim 5 in which said last means includes a condenser connected in series between said cathode and said discharge device.

7. A system according to claim 6 including a bypass resistor from the positive terminal of said source of B potential to the cathode of said tube, said tube having a control grid and means connecting said control grid to the negative terminal of said source of B potential.

JAMES L. RUSSELL.

References Cited in the file of this patent

UNITED STATES PATENTS

| Number | Name | Date |
|---|---|---|
| 2,400,796 | Watts et al. | May 21, 1946 |
| 2,410,066 | Harrison | Oct. 29, 1946 |
| 2,424,030 | Hayes | July 15, 1947 |
| 2,433,361 | Harrison | Dec. 30, 1947 |
| 2,449,358 | Zappacosta | Sept. 14, 1948 |
| 2,476,902 | Paine | July 19, 1949 |

FOREIGN PATENTS

| Number | Country | Date |
|---|---|---|
| 402,829 | Great Britain | Dec. 11, 1933 |
| 453,512 | Great Britain | Sept. 14, 1936 |